(12) United States Patent
Lee et al.

(10) Patent No.: US 10,208,883 B2
(45) Date of Patent: Feb. 19, 2019

(54) PRESSURE CONTROL APPARATUS

(71) Applicant: Golder Associates Inc., Atlanta, GA (US)

(72) Inventors: Chris Lee, Sudbury (CA); Craig Vucinovich, Elsha, IL (US); Brendan John Hampshire, Bracknell (GB)

(73) Assignee: Golder Associates Inc., Atlanta, GA (US)

( * ) Notice: Subject to any disclaimer, the term of this patent is extended or adjusted under 35 U.S.C. 154(b) by 173 days.

(21) Appl. No.: 15/200,589

(22) Filed: Jul. 1, 2016

(65) Prior Publication Data

US 2018/0003316 A1    Jan. 4, 2018

(51) Int. Cl.
| | |
|---|---|
| F16K 31/60 | (2006.01) |
| F16L 55/07 | (2006.01) |
| F16K 31/46 | (2006.01) |
| E21F 17/00 | (2006.01) |
| E21F 15/00 | (2006.01) |

(52) U.S. Cl.
CPC ............. *F16L 55/07* (2013.01); *E21F 17/00* (2013.01); *F16K 31/46* (2013.01); *F16K 31/60* (2013.01); *E21F 15/00* (2013.01); *Y10T 137/7043* (2015.04); *Y10T 137/7256* (2015.04)

(58) Field of Classification Search
CPC ........ F16K 31/46; F16K 31/60; F16K 31/602; F16K 3/24; F16K 1/00; F16K 35/02; F04B 53/04; Y10S 16/12; Y10T 16/498; Y10T 74/20732; Y10T 137/7256; Y10T 137/7043; E21F 15/00; E21F 17/00; F16L 55/07

USPC ....... 251/293, 291, 292, 98, 95, 90–93, 146; 137/385, 377
See application file for complete search history.

(56) References Cited

U.S. PATENT DOCUMENTS

| | | | | |
|---|---|---|---|---|
| 839,878 | A * | 1/1907 | Niederlander | F16K 27/07 137/348 |
| 1,379,927 | A * | 5/1921 | Kneass | F16K 35/02 251/279 |
| 1,389,876 | A * | 9/1921 | Keppler | B60K 15/00 137/351 |
| 1,393,882 | A * | 10/1921 | Cornell | B60T 17/043 137/349 |
| 1,480,936 | A * | 1/1924 | Gonder | F04B 53/04 251/146 |
| 1,497,719 | A * | 6/1924 | Hansen | F04B 53/04 251/146 |
| 2,067,612 | A * | 1/1937 | Loeffler | F01L 13/08 123/182.1 |

(Continued)

*Primary Examiner* — Craig J Price
*Assistant Examiner* — Andrew J Rost
(74) *Attorney, Agent, or Firm* — Steve LeBlanc, LLC

(57) ABSTRACT

A pressure control apparatus includes a main line section and a branch line operably joined to and extending from the main line section. A housing around the branch line has a first wall and a second wall opposed to the first wall, and a first opening is in the first wall. A plug is operably positioned in the branch line, and the plug has a first position that prevents fluid flow through the branch line and a second position that permits fluid flow through the branch line. A loop extends from the plug, and a lever pivotally connected to the second wall and extending through the loop and the first opening in the first wall positions the plug to the first and second positions.

10 Claims, 5 Drawing Sheets

(56) References Cited

U.S. PATENT DOCUMENTS 3,010,478 A * 11/1961 Buck ................ F16L 41/00
                                            137/561 R
3,503,416 A *  3/1970 Clarkson ............ F16K 1/38
                                            137/375

* cited by examiner

PRESSURE CONTROL APPARATUS

FIELD OF THE INVENTION

The present invention generally relates to a pressure control apparatus. In particular embodiments, the apparatus may be used to control pressure in a pipe or vessel, either by relieving or increasing pipeline pressure, without interrupting flow in the pipeline.

BACKGROUND OF THE INVENTION

Piping systems are well-known for conveying fluids or slurries between locations. Common practice in such applications is to provide a tee-piece in the pipeline. The branch of the tee-piece accommodates a plug which is anchored in position to close the branch during normal flow. If it is necessary to relieve an overpressure condition in the pipeline, an anchoring device, such as a clamp, may be released, freeing the plug to retreat in the branch.

One problem which can be encountered in this operation is rapid release of the plug and pipe contents, creating a danger for personnel in the vicinity. Another potential problem is that slurry conveyed in the pipeline can jam the plug in the branch. Considerable force, for example produced by blasting, may then have to be applied to release the plug.

The present application seeks to provide an apparatus which addresses one or more of these potential problems.

BRIEF DESCRIPTION OF THE INVENTION

Aspects and advantages of the invention are set forth below in the following description, or may be obvious from the description, or may be learned through practice of the invention.

In one embodiment of the present invention, a pressure control apparatus includes a main line section and a branch line operably joined to and extending from the main line section. A housing around the branch line has a first wall and a second wall opposed to the first wall, and a first opening is in the first wall. A plug is operably positioned in the branch line, and the plug has a first position that prevents fluid flow through the branch line and a second position that permits fluid flow through the branch line. A loop extends from the plug, and a lever pivotally connected to the second wall and extending through the loop and the first opening in the first wall positions the plug to the first and second positions.

In particular embodiments, the main line section is configured to connect to opposing sections of the pipeline. In other particular embodiments, the first opening in the first wall includes a first portion and a second portion perpendicular to the first portion, and the lever extends through the first portion when the plug is in the first position and through the second portion when the plug is in the second position. In still further embodiments, the lever extends through a second opening in the second wall, and a locating lug on the lever is engaged with the second opening in the second wall.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
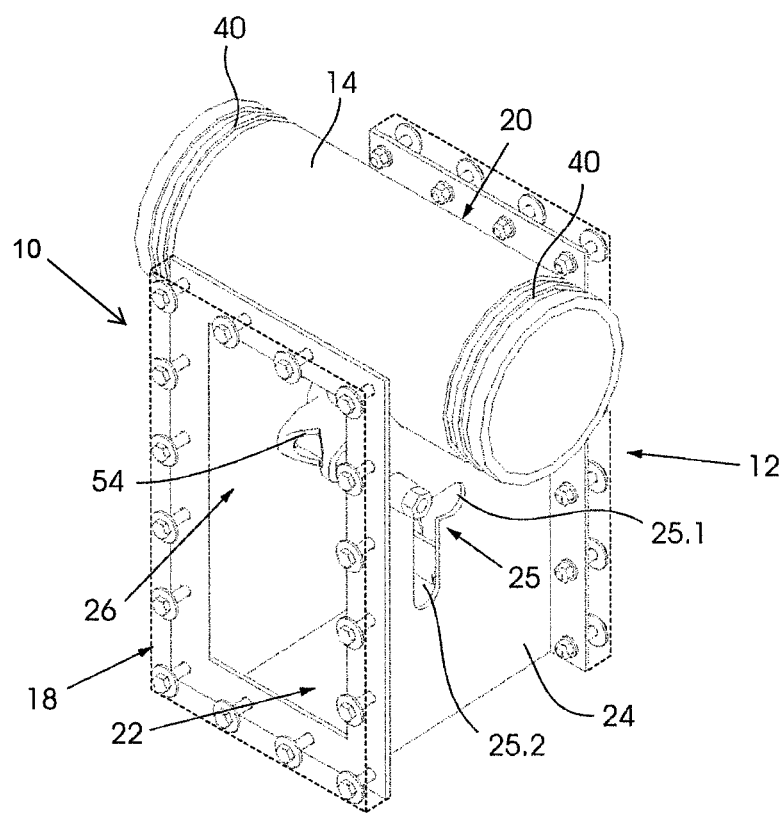
FIG. 1 is a perspective view of a pressure control apparatus according one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

Each example is provided by way of explanation of the invention, not limitation of the invention. In fact, it will be apparent to those skilled in the art that modifications and variations can be made to embodiments of the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention include a pressure control apparatus 10 that may be used to control pressure in a pipeline conveying mine backfill or slurry. The apparatus 10 generally includes a tee-piece 12 having a main line section 14 and a branch line 16 joined to the main line section. The branch line 16 may be located within a housing 18 with a rectangular cross-section with an open top 20 and an open bottom 22. Two opposed side walls 24, 26 of the housing 18 may be formed by steel plates, and the other two opposed side walls 28, 29 may be formed by transparent panels, typically of robust polycarbonate, bolted to flanges carried by the side walls.

The side walls 24, 26 may be formed with arcuate cut-outs at their upper edges that receive the main line section 14 of the tee-piece 12. One side wall 24 may be formed with an opening 25 of inverted L-shape which has a horizontal portion 25.1 and a vertical portion 25.2. The opposite side wall 26 may be formed with a slot-shaped opening 30 and a cover 32 spaced from and extending over this opening 30.

Figure 2:
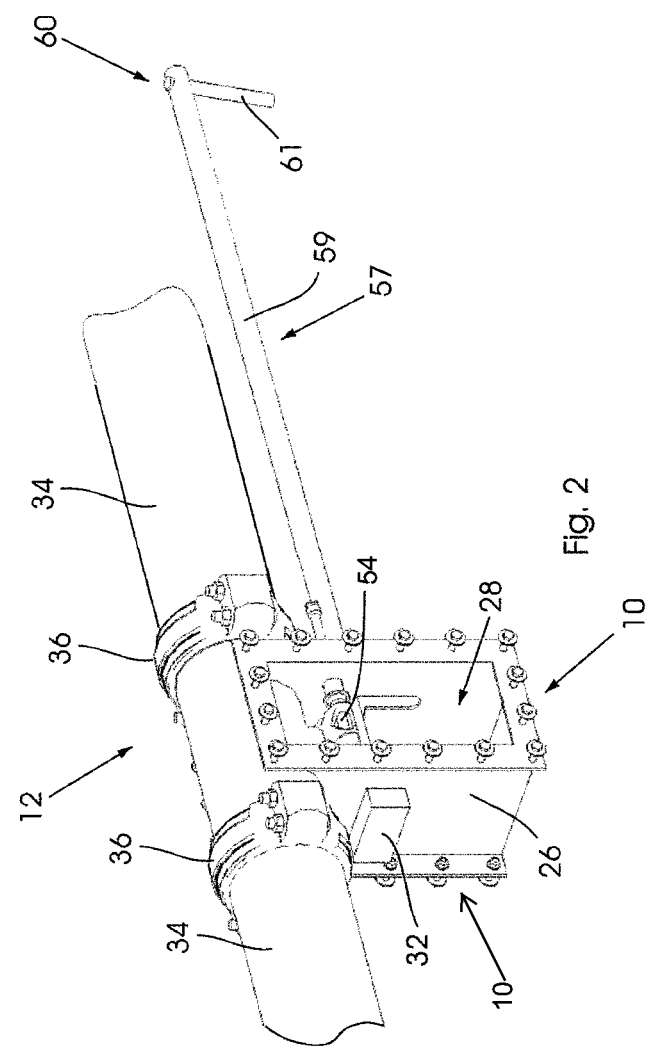
FIG. 2 is a perspective view of the apparatus shown in FIG. 1 installed in a pipeline.
Figure 3:
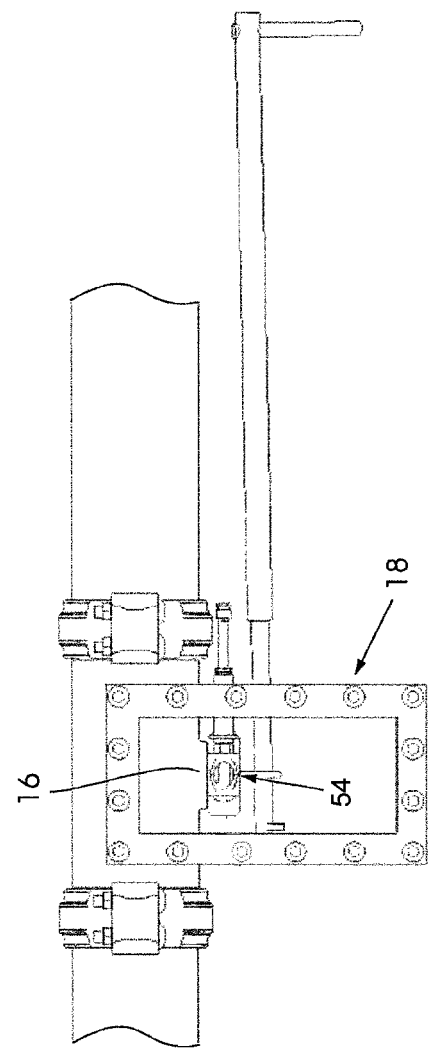
FIG. 3 is a side view of the installed apparatus.
Figure 4:
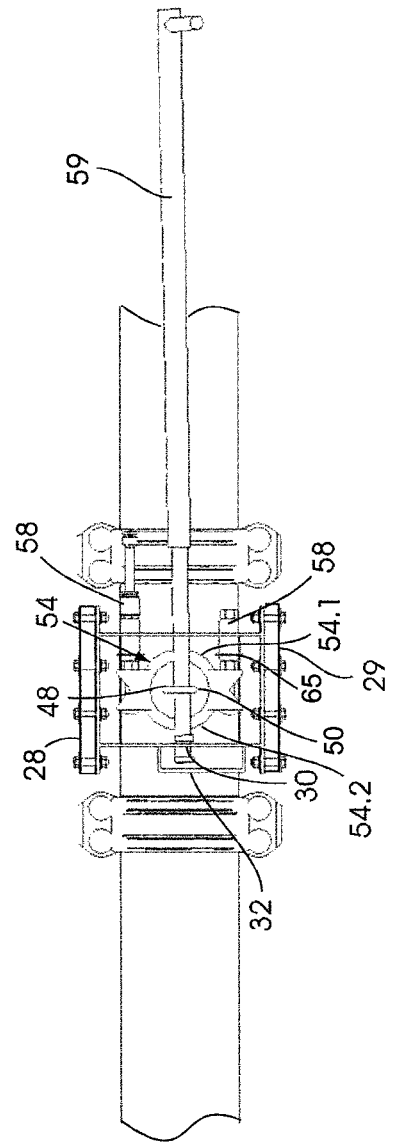
FIG. 4 is a bottom view of the installed apparatus.

As shown in FIGS. 2-4, the tee-piece 12 may be connected into a pipeline 34. This may be achieved by connecting the ends of the main line section 14 to ends of the pipeline 34 by means of clamps 36 such as Victaulic®-type couplings which engage grooves 40 in the ends of the main line section 14 and in the ends of the pipeline 34. The main line section 14 may have a diameter matching that of the pipeline 34 so that the main line section 14 effectively forms part of the pipeline 34.

Figures 5, 6:
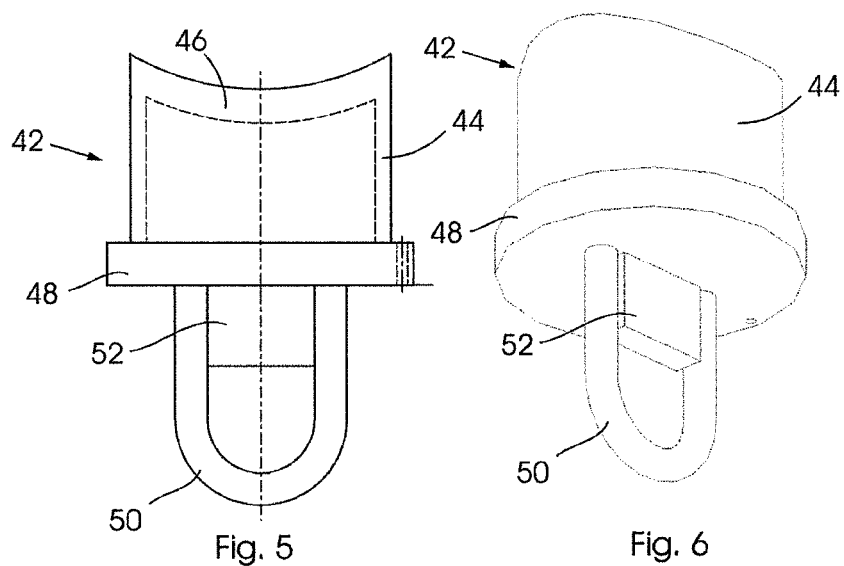
FIG. 5 is a side view of a plug used in the apparatus.
FIG. 6 is a perspective view of the plug.
Figure 7:
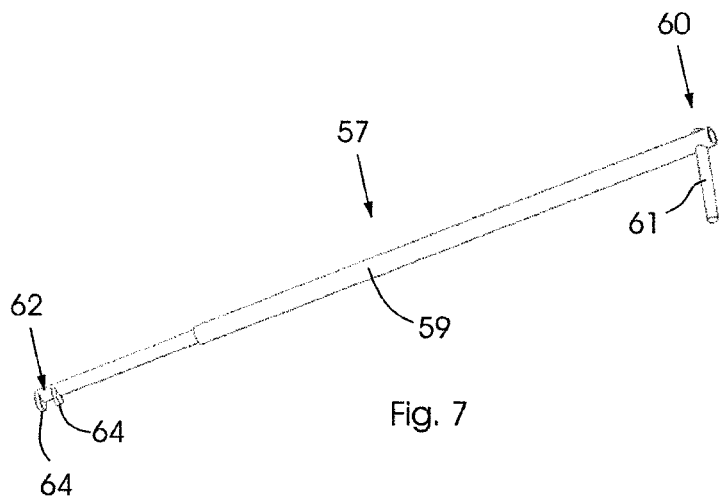
FIG. 7 shows a side view of a lever used in the apparatus.

The branch line 16 may accommodate a plug 42, seen in more detail in FIGS. 5 and 6. The plug 42 may have a cylindrical body 44, the upper end of which may form a part-cylindrical face 46. The curvature of the face 46 may correspond to the internal curvature of the main line section 14 and the pipeline 34. The plug 42 may include a flange 48 at the lower end of the body and a U-shaped loop 50 extending from the flange. A plate 52 may be fixed between the legs of the loop 50, adjacent the flange 48.

The outside diameter of the cylindrical body 44 may be selected such that the plug 42 can be inserted into the branch line 16 as a close slide fit. When the plug 42 is fully inserted, the flange 48 may abut the end of the branch line 16, and the face 46 may lie flush with the inner surface of the main line section 14. The plug 42 may be anchored in the fully inserted position by an anchoring device, in this embodiment a Victaulic®-type coupling 54.

The coupling 54 may have two generally semicircular shells 54.1 and 54.2 which are assembled to form a generally circular shape. The ends of the shells may be drawn together in use by means of connecting bolts and associated nuts 58. In particular embodiments, the assembled coupling 54 may engage a groove at the end of the branch line 16 and the flange 48 of the plug 42.

The nuts 58 may be elongate in shape and, in particular embodiments, project through holes in the side wall 24 of the housing 18 so as to be accessible from outside the housing. It will accordingly be understood that the coupling 54 can be tightened or released by application of a suitable spanner or other tool to the projecting ends of the nuts 58.

The apparatus of the invention may further include a lever 57. The lever 57 may have an elongate lever bar 59, with a handle end 60 at which there is a transverse handle 61 and an opposite end 62 carrying spaced apart, transverse locating lugs 64. In use, the end 62 of the lever 57 may be inserted into the housing 18 through the L-shaped opening 25 and passed through the loop 50 of the plug 42. The end 62 may be inserted a short distance through the opening 30 in the housing side wall 26 such that the wall 26 is captive between the lugs 64.

During normal operation of the pipeline 34, the lever bar 59 passes through the horizontal portion 25.1 of the opening 25. In this position, the lever 57 presses up against the lower edge of the plate 52 and thus urges the plug 42 to its fully inserted position.

If an overpressure condition develops in the pipeline 34 and it is considered necessary to relieve the pressure, the coupling 54 is released by appropriate rotation of the nuts 58. The plug 42 is, however, still restrained in its fully inserted position by the lever bar 59. The lever bar 59 can now be moved into alignment with the vertical portion 25.2 of the opening 25 and lowered in that portion by manipulation of the handle end 60. It will be understood that the end 62 of the lever bar 59 pivots relative to the side wall 26 of the housing 18 as the bar 59 is lowered. Lowering of the lever bar 59 allows the plug 42 to withdraw in the branch line 16, i.e., to move in the branch line 16 in a direction away from the main line section 14.

If the plug 42 is locked or jammed in the branch line 16, possibly by local solidification of the slurry conveyed in the pipeline 34, the lever 57 may also be forcibly manipulated to free the plug 42. The bar 59 may, for example, be pivoted forcibly in a downward direction so as to bump or knock against the loop 50 to achieve this. The bar 59 may also be pivoted from side to side so as to bump or knock against the sides of the loop 50 to assist in freeing the plug 42.

In practice, the lever 57 may be manipulated so as to allow withdrawal of the plug 42 through a distance sufficient to achieve the required pressure relief. If pipeline 34 pressure is to be increased, the bar 59 can be pivoted upwardly to push the plug 42 upwardly in the branch line 16. It will accordingly be understood that the lever 57 can be manipulated as necessary, by manual action on the handle end 60, to control the pipeline 34 pressure.

At full pressure, the bar 59 may again be located in the portion 25.1 of the opening 25 to restrain the plug 42 while the coupling 54 is again applied. As long as the lever bar 59 is in position, the plug 42 cannot withdraw completely from the branch line 16. The bar 59 accordingly prevents the plug 42 from being ejected suddenly with potentially dangerous consequences.

If the pipeline 34 is to be vented or drained completely after suitable relief of the pressure in the manner described above, the lever bar 59 may be rotated to align the locating lugs 64 with the length of the opening 30. The end 62 of the bar can then be pulled back through the opening 30, through the loop 50, and through the opening 25, i.e., the lever bar 59 may be completely withdrawn from the housing 18. This allows the plug 42 to be removed entirely from the branch line 16, allowing complete venting or drainage of the pipeline 34 to take place. It will be understood that the reverse procedure is carried out to replace the plug 42 in its fully inserted position.

The transparent side walls 28, 29 of the housing 18 allow an observer to see what is happening inside the housing 18 without being exposed to sudden and dangerous ejection of high pressure slurry or other liquid. The nuts 58 carry flanges 65 which will cover the holes 25 in the side wall 26 through which the nuts 58 pass if the nuts 58 are released. This prevents uncontrolled passage or spray of pressurized liquid through the holes 25.

One of ordinary skill in the art will readily appreciate from the preceding description of embodiments of the invention that the apparatus 10 may cause or allow movement of the plug 42 from its fully inserted position to a partially withdrawn position in the branch line 16, thereby to relieve pressure in the pipeline 34 or vessel without complete removal of the plug 42 from the branch line 16. Alternately or in addition, the apparatus 10 may cause or allow removal of the plug 42 from the branch line 16, from either the fully inserted or partially withdrawn position, thereby to allow venting of the pipeline 34 or vessel. Moreover, the apparatus may move the plug 42 from the partially withdrawn position to the fully inserted position, thereby to allow pressure to build up in the pipeline 34 or vessel.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A pipeline pressure control apparatus, comprising:
   a main line section;
   a branch line operably joined to and extending from said main line section;

a housing around said branch line, wherein said housing has a first wall and a second wall opposed to said first wall with said first and second walls located on opposite sides of said branch line;
a first opening in said first wall;
a plug operably positioned in said branch line, wherein said plug has a first position that prevents fluid flow through said branch line and a second position that permits fluid flow through said branch line;
a loop extending from said plug;
a lever pivotally connected to said second wall and extending through said loop and said first opening in said first wall, wherein said lever positions said plug to said first and second positions; and
wherein said plug is flush with said main line section when said plug is in said first position.

2. The pipeline pressure control apparatus as in claim 1, wherein said main line section is configured to connect to opposing sections of a pipeline.

3. The pipeline pressure control apparatus as in claim 1, wherein said first opening in said first wall comprises a horizontal portion connected to a vertical portion.

4. The pipeline pressure control apparatus as in claim 3, wherein said lever extends through said horizontal portion when said plug is in said first position and through said vertical portion when said plug is in said second position.

5. The pipeline pressure control apparatus as in claim 1, further comprising a second opening in said second wall, wherein said lever extends through said second opening in said second wall.

6. The pipeline pressure control apparatus as in claim 5, further comprising a locating lug on said lever, wherein said locating lug is engaged with said second opening in said second wall.

7. A pipeline pressure control apparatus, comprising:
a branch line operably joined to and extending from a pipeline;
a housing around said branch line, wherein said housing has a first wall and a second wall opposed to said first wall with said first and second walls located on opposite sides of said branch line;
a first opening in said first wall;
a plug operably positioned in said branch line, wherein said plug has a first position that prevents fluid flow through said branch line and a second position that permits fluid flow through said branch line;
a loop extending from said plug;
a lever pivotally connected to said second wall and extending through said loop and said first opening in said first wall, wherein said lever positions said plug to said first and second positions;
wherein said first opening in said first wall comprises a first portion and a second portion perpendicular to said first portion and said lever extends through said first portion when said plug is in said first position and through said second portion when said plug is in said second position.

8. The pipeline pressure control apparatus as in claim 7, further comprising a second opening in said second wall, wherein said lever extends through said second opening in said second wall.

9. The pipeline pressure control apparatus as in claim 8, further comprising a locating lug on said lever, wherein said locating lug is engaged with said second opening in said second wall.

10. The pipeline pressure control apparatus as in claim 7, wherein said plug is flush with the pipeline when said plug is in said first position.

\* \* \* \* \*